United States Patent
Wachsmuth

(10) Patent No.: US 7,158,295 B2
(45) Date of Patent: Jan. 2, 2007

(54) APPARATUS AND METHOD FOR DETERMINING DIRECTIONAL TRANSPORT PROCESSES

(75) Inventor: Malte Wachsmuth, Heidelberg (DE)

(73) Assignee: Leica Microsystems CMS GmbH, Wetzlar (DE)

(*) Notice: Subject to any disclaimer, the term of this patent is extended or adjusted under 35 U.S.C. 154(b) by 200 days.

(21) Appl. No.: 10/869,745

(22) Filed: Jun. 16, 2004

(65) Prior Publication Data

US 2004/0257646 A1    Dec. 23, 2004

(30) Foreign Application Priority Data

Jun. 17, 2003   (DE)   ................. 103 27 486

(51) Int. Cl.
    G02B 21/06    (2006.01)
(52) U.S. Cl. .................... 359/385; 359/203
(58) Field of Classification Search ........... 359/385, 359/388, 368, 618, 634, 372
    See application file for complete search history.

(56) References Cited

U.S. PATENT DOCUMENTS

| | | | | |
|---|---|---|---|---|
| 4,739,177 A | * | 4/1988 | Borden | 250/574 |
| 5,671,085 A | * | 9/1997 | Gustafsson et al. | 359/385 |
| 5,764,363 A | | 6/1998 | Ooki et al. | |
| 5,801,881 A | * | 9/1998 | Lanni et al. | 359/386 |
| 6,028,306 A | * | 2/2000 | Hayashi | 250/235 |
| 6,091,523 A | * | 7/2000 | Brandstetter | 398/39 |
| 6,320,196 B1 | * | 11/2001 | Dorsel et al. | 250/458.1 |
| 6,369,928 B1 | * | 4/2002 | Mandella et al. | 359/204 |
| 6,400,487 B1 | * | 6/2002 | Harris et al. | 359/210 |
| 6,657,216 B1 | * | 12/2003 | Poris | 250/559.22 |
| 6,720,547 B1 | * | 4/2004 | Rajadhyaksha et al. | 250/225 |
| 6,867,919 B1 | * | 3/2005 | Seyfried | 359/618 |
| 2002/0027709 A1 | * | 3/2002 | Engelhardt et al. | 359/385 |
| 2002/0191178 A1 | * | 12/2002 | Watkins et al. | 356/237.2 |
| 2003/0127609 A1 | * | 7/2003 | El-Hage et al. | 250/574 |

FOREIGN PATENT DOCUMENTS

DE   196 26 261 A1   1/1997
EP   0 941 470 B1    9/1999

OTHER PUBLICATIONS

Michael Brinkmeier, "Cross-correlated Flow Analysis in Microstructures," pp. 379-395.

Petra S. Dittrich, et al., "Spatial Two-Photon Fluorescence Cross-Correlation Spectroscopy for Controlling Molecular Transport in Microfluidic Structures," Anal. Chem 2002, 74, pp. 4472-4479.

* cited by examiner

Primary Examiner—Mark A. Robinson
Assistant Examiner—Scott Stephens
(74) Attorney, Agent, or Firm—Houston Eliseeva LLP

(57) ABSTRACT

An apparatus for determining directional transport processes with a scanning microscope (100) is disclosed. A deflection means (5) for coupling in an illuminating light beam (3), and a scanning module (7) for graphical display of a specimen (15) on a peripheral device (27) and for positioning the illuminating light beam (3) for a specific time period on a location of the specimen (15), are provided. Provided between the deflection means (5) and the scanning module (7) is a device (65) that generates, from the illuminating light beam (3), at least two illuminating light beams (3a, 3b) that merge at a rotation point (70) of the scanning module (7). Each of the several illuminating light beams (3a, 3b) generates a respective focus (72) in the specimen (15), all the foci (72) being arranged in one plane (75).

23 Claims, 6 Drawing Sheets

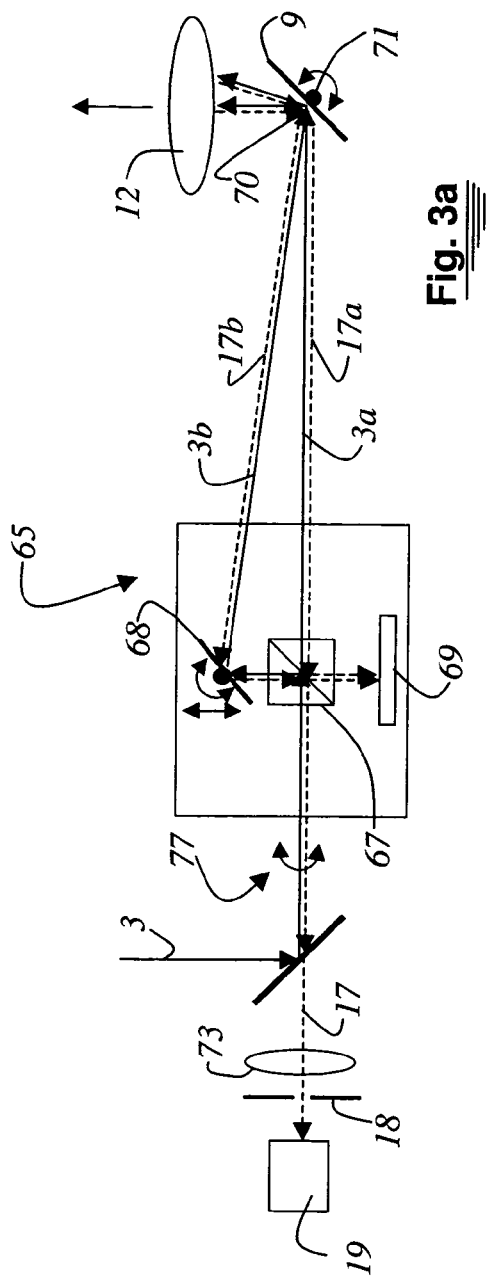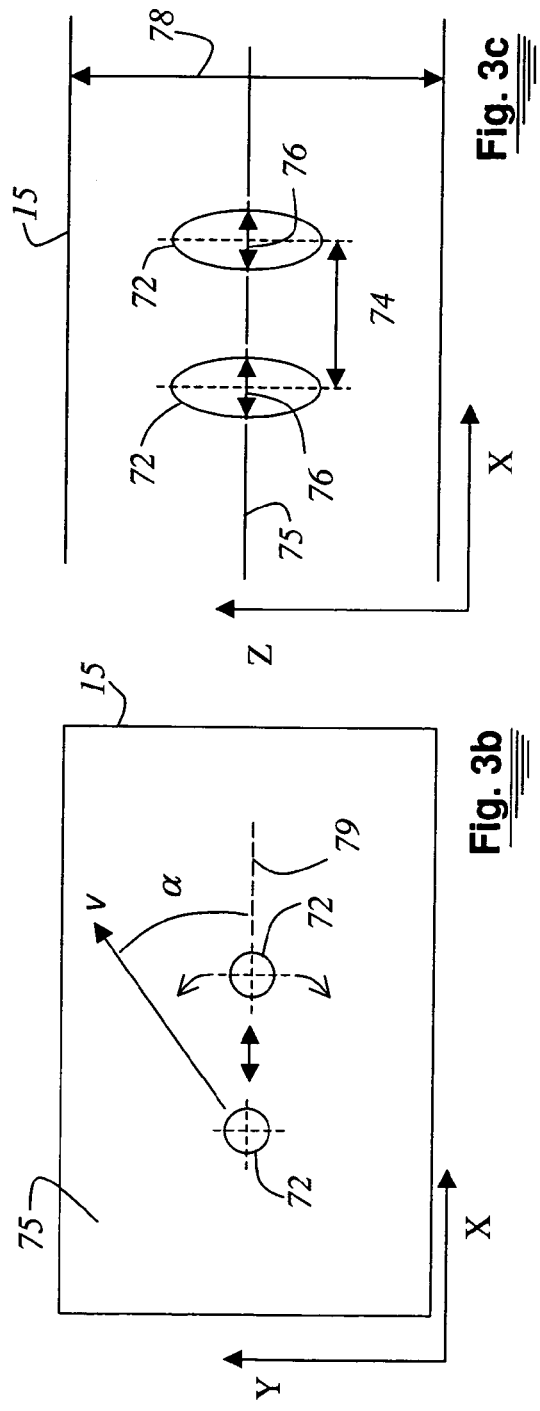

APPARATUS AND METHOD FOR DETERMINING DIRECTIONAL TRANSPORT PROCESSES

RELATED APPLICATIONS

European Patent EP 0 941 470 discloses a system in which a Fluorescence Correlation Spectroscopy (FCS) module is associated with an imaging scanning microscope. The FCS module is coupled directly onto the scanning microscope. The light for FCS examination is coupled out of the detection beam path of the scanning microscope and conveyed to the FCS module. Unequivocal detection of the diffusion direction is not possible with this system.

FIELD OF THE INVENTION

The invention concerns an apparatus for determining directional transport processes.

The invention furthermore concerns a method for determining directional transport processes. The invention concerns in particular a method for determining directional transport processes using a scanning microscope that encompasses a deflection means for coupling in an illuminating light beam and a scanning module for graphical display of a specimen on a peripheral device and for positioning the illuminating light beam for a specific time period on a location of the specimen.

BACKGROUND OF THE INVENTION

Fluorescence correlation spectroscopy, in its implementation in a microscope assemblage, is suitable for the investigation not only of non-directional molecular diffusion, but also of directional transport processes, such as particle flow, that may be overlaid on the diffusion. The concentration and diffusion coefficient of correspondingly labeled molecules, and the absolute value of their flow velocity can be derived from autocorrelation analysis of the fluorescence signal of the molecules. The radial symmetry of the focus about the optical axis makes it impossible, however, to determine the direction of the flow. (Publications: Brinkmeier (2001) in: Fluorescence Correlation Spectroscopy—Theory and Application, pp. 379–395, eds.: R. Rigler, E. Elson, Springer-Verlag, Heidelberg/Berlin; Dittrich & Schwille (2002): Anal. Chem. 74, 4472).

European Patent EP 0 941 470 discloses a system in which an FCS module is associated with an imaging scanning microscope. The FCS module is coupled directly onto the scanning microscope. The light for FCS examination is coupled out of the detection beam path of the scanning microscope and conveyed to the FCS module. Unequivocal detection of the diffusion direction is not possible with this system.

SUMMARY OF THE INVENTION

It is the object of the invention to create an apparatus with which diffusion processes in a specimen or a sample can be determined and evaluated.

The object is achieved by way of an apparatus comprising:
a deflection means for coupling in an illuminating light beam,
a scanning module for scanning the illuminating light beam across a specimen, for graphical display of the specimen on a peripheral device and for positioning the illuminating light beam for a specific time period on a location of the specimen,
a first device for generating at least two illuminating light beams, wherein the device is provided between the deflection means and the scanning module, and
a rotation point is defined on the scanning module in which the illuminating light beams merge and wherein each of the illuminating light beams defining a focus in the specimen that are all arranged in one plane.

It is the object of the invention to create a method with which diffusion processes in a specimen or a sample can be determined and evaluated.

The aforesaid object is achieved by way of a method comprising the steps of:
generating at least two illuminating light beams from the illuminating light beam, by a device being provided for that purpose between the deflection means and the scanning module;
combining the illuminating light beams at a rotation point of the scanning module; and
defining a respective focus for each illuminating light beam, all the foci being arranged in one plane.

It is particularly advantageous for detection of the diffusion direction if two foci, slightly shifted with respect to one another, are used (bifocal configuration). The absolute value of the flow velocity can be determined from a cross-correlation of the signals from these foci. The flow direction can be ascertained by rotating the connecting line between the foci about the optical axis or the direction defined by the illuminating light beam. The disadvantage of the existing art is the complexity of configuring and aligning two confocal beam paths shifted slightly with respect to one another. Adjustment of the spacing, as well as rotation, are also laborious. Integration into, for example, existing confocal laser scanning microscopes is difficult if not impossible.

It is particularly advantageous if the scanning microscope is equipped with a deflection means for coupling in an illuminating light beam. It has proven to be particularly convenient and user-friendly if the deflection means is configured in the form of an AOBS™. Also provided is a scanning module with which a graphical display of a specimen on a peripheral device is also possible. The scanning module can also be used to position the illuminating light beam for a specific time period on a location of the specimen. The at least one location can be selected by the user, for example, on the display using a mouse. Provided between the deflection means and the scanning module is a device that generates, from the illuminating light beam, at least two illuminating light beams that merge at a rotation point of the scanning module. Respective corresponding foci that are all arranged in one plane are then defined in the specimen by way of the several illuminating light beams.

The device encompasses a neutral or dichroic beam splitter that splits the illuminating light beam into a first and a second illuminating light beam. A displaceable and/or pivotable deflection mirror is associated with one of the illuminating light beams. With the displaceable and/or pivotable deflection mirror, it is possible to perform an adjustment such that the illuminating light beams split by the beam splitter merge at the rotation point of the scanning module. To eliminate undesirable scattered radiation, a beam trap is associated with the beam splitter opposite the deflection mirror.

The device is furthermore equipped in such a way that the detected light beams proceeding from the specimen are combined into a single detected light beam. The detected light beam is directed, by a beam splitter provided in a housing, onto a first and a second detection channel. Downstream from the first and the second detection channel is a respective multimode fiber that conveys the detected light beam to a respective avalanche photodiode. The avalanche photodiodes are accommodated together in a housing in order to ensure sufficient cooling and light-tightness for the avalanche photodiodes.

The device provided in the apparatus according to the present invention is furthermore arranged in a housing. The device is rotatable about a rotation axis, the rotation axis coinciding with the direction defined by the illuminating light beam and the detected light beam.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which:

FIG. 3a schematically depicts the device for bifocal illumination of a specimen for FCS analysis;

FIG. 3b shows the arrangement of the focal volumes in the specimen in a plan view;

FIG. 3c shows the arrangement of the focal volumes in the specimen, depicting a cross section through the sample or specimen;

DETAILED DESCRIPTION OF THE PREFERRED EMBODIMENTS

Figure 1:
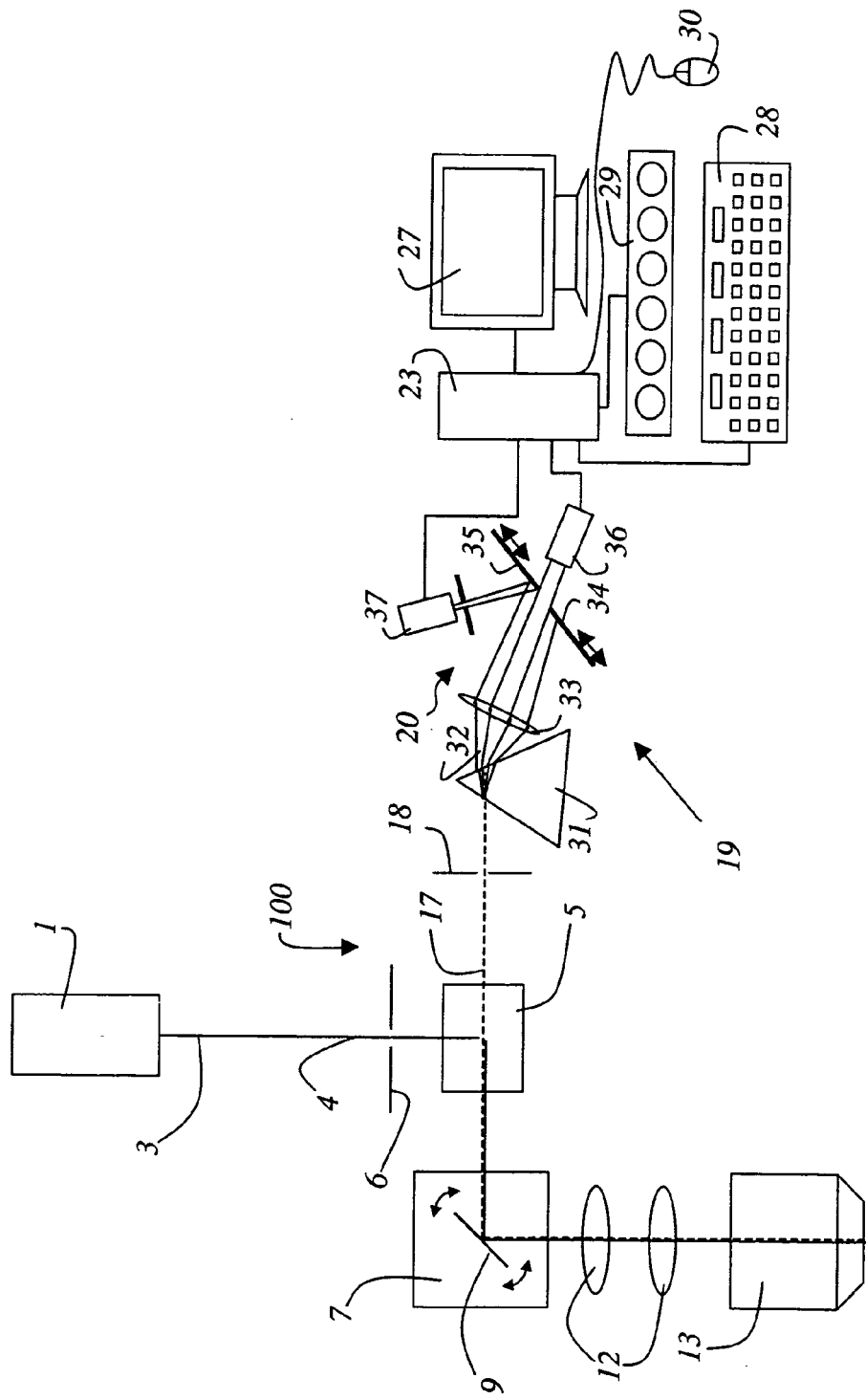
FIG. 1 schematically depicts a scanning microscope having an SP module.

FIG. 1 shows the schematic configuration of a confocal scanning microscope 100 in which the apparatus according to the present invention is used. Illuminating light beam 3 coming from at least one illumination system 1 is directed by a beam splitter or a suitable deflection means 5 to a scanning module 7. Before illuminating light beam 3 strikes deflection means 5, it passes through an illumination pinhole 6. Scanning module 7 encompasses a gimbal-mounted scanning mirror 9 that guides illuminating light beam 3, through a scanning optical system 12 and a microscope optical system 13, over or through a specimen 15. In the case of non-transparent specimens 15, illuminating light beam 3 is guided over the specimen surface. With biological specimens 15 (preparations) or transparent specimens, illuminating light beam 3 can also be guided through specimen 15. For these purposes, non-luminous preparations are prepared, if applicable, with a suitable dye (not depicted, since it is established existing art). The dyes present in the specimen are excited by illuminating light beam 3 and emit light in a characteristic region of the spectrum peculiar to them. This light proceeding from specimen 15 defines a detected light beam 17. The latter travels through microscope optical system 13 and scanning optical system 12 and via scanning module 7 to deflection means 5, passes through the latter, and arrives via a detection pinhole 18 at at least one detector 19, which is embodied as a photomultiplier. It is clear to one skilled in the art that other detection components, for example diodes, diode arrays, photomultiplier arrays, CCD chips, or CMOS image sensors, can also be used. Detected light beam 17 proceeding from and defined by specimen 15 is depicted in FIG. 1 as a dashed line. Electrical detected signals proportional to the power level of the light proceeding from specimen 15 are generated in detector 19. Because, as already mentioned above, light of more than one wavelength is emitted from specimen 15, it is advisable to insert in front of the at least one detector 19 a selection means for the spectrum proceeding from the sample. In the embodiment shown here, the selection means is an SP module 20. SP module 20 is embodied in such a way that it can acquire a complete lambda scan, i.e. all the wavelengths proceeding from specimen 15 are recorded. The data generated by detector 19 are forwarded to a computer system 23. At least one peripheral device 27 is associated with computer system 23. Peripheral device 27 can be, for example, a display on which the user receives instructions for setting the scanning microscope or can view the current setup and also the image data in graphical form. Also associated with computer system 23 is an input means that comprises, for example, a keyboard 28, an adjusting apparatus 29 for the components of the microscope system, and a mouse 30. Detected light beam 17 is spatially spectrally divided with a prism 31. A further possibility for spectral division is the use of a reflection or transmission grating. The spectrally divided light fan 32 is focused with focusing optical system 33, and then strikes a mirror stop arrangement 34, 35. Mirror stop arrangement 34, 35, the means for spectral spatial division, focusing optical system 33, and detectors 36 and 37 are together referred to as the SP module (or multi-band detector) 20.

Figure 2:
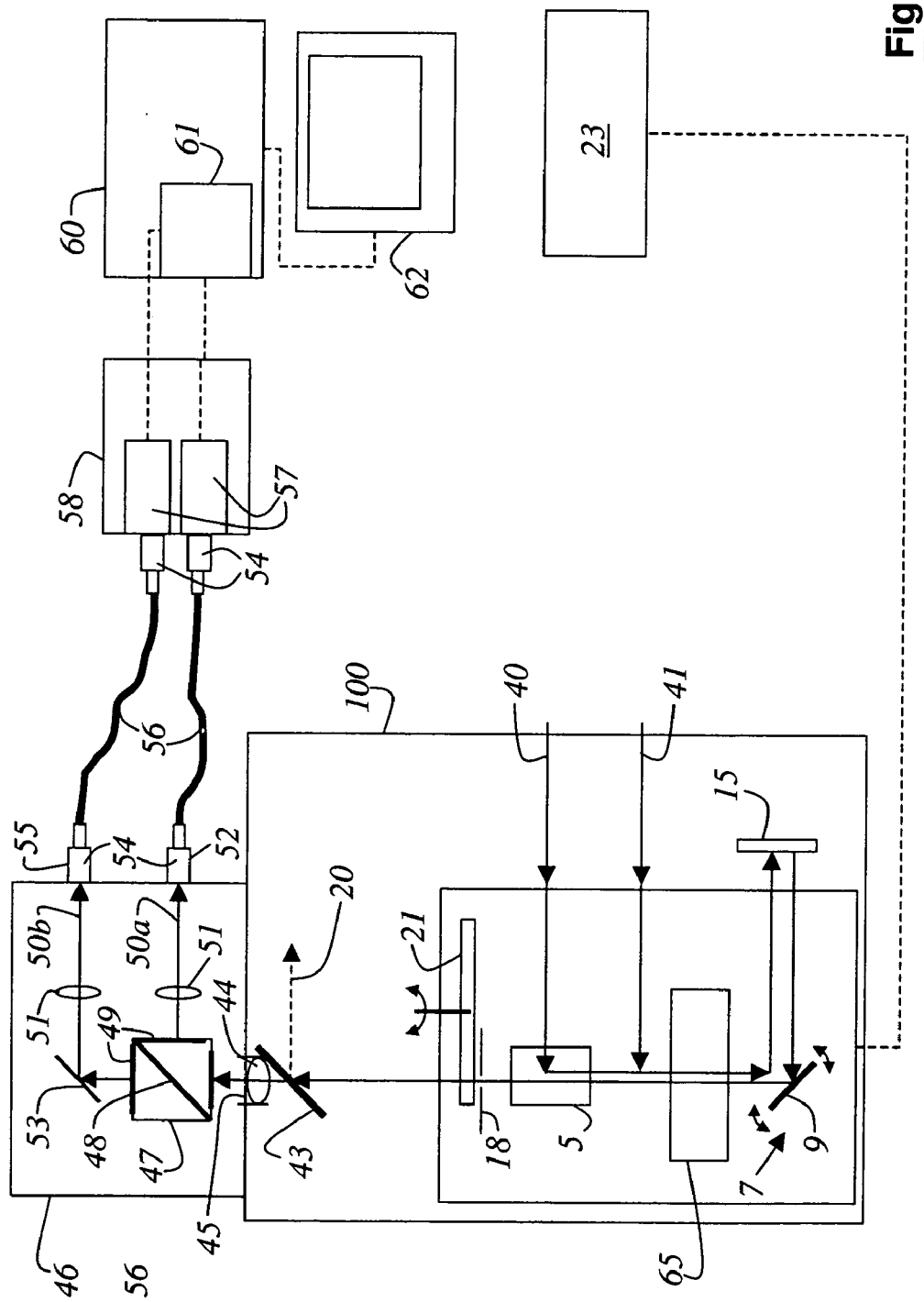
FIG. 2 schematically depicts the arrangement of the device components for FCS analysis in a scanning microscope.

FIG. 2 schematically depicts the arrangement of several device components for FCS analysis in scanning microscope 100. A conventional scanning microscope 100, with which a conventional SP module 20 is associated, is used for the FCS analysis. Scanning microscope 100 is equipped with a deflection means 5 that functions as the main beam splitter and is embodied as a beam splitter slider or AOBS™. All available visible laser lines can be coupled in via a first input 40 as light sources. Incoupling of UV radiation or IR radiation, which is usable for multi-photon applications (and also FCS), is accomplished via a second input 41. In FIG. 2, the beam direction toward SP module 20 is indicated by the dashed arrow. The detected light (light proceeding from specimen 15) passes through microscope optical system (not depicted in FIG. 2), scanning mirror 9, deflection means 5, detection pinhole 18, optionally a filter wheel 21 to block out the excitation light, and an adjustable beam splitter slider 43, which contains a mirror for complete deflection into SP module 20, a beam splitter or a single substrate for partial deflection into SP module 20, or an empty space. The beam of detected light is collimated by a downstream lens 44. Located behind this lens 44 is an output 45 out of the stand of scanning microscope 100. Mounted above this output 45 is a housing 46 in which a changeable filter cube 47 is located. At (removable) beam splitter 48 that is provided in filter cube 47, the detected light is split into two components, e.g. into a "red" component 50a and a "blue" component 50*b*. Additional filters 49 provide further blocking of the excitation light and of other undesired light components. These are optional when an AOBS is used as deflection means 5. One sub-beam, for example "red" component 50*a*, is then focused with a lens 51 directly onto first detection channel 52. The second sub-beam, for example "blue" component 50*b*, is focused via an additional deflection mirror 53, likewise with a lens 51, onto a second detection channel 55. Each channel is made up of a standard FC socket 54, a standard multimode fiber 56 having a light-tight sheath and equipped with an FC connector at each of the two ends, a further FC socket 54, and an avalanche photodiode (APD) 57. APDs 57 are characterized by their particularly high detection efficiency as compared with photomultiplier tubes, especially in the visible wavelength region. The two APDs 57 are accommodated together in one housing 58, to ensure sufficient cooling and light-tightness for the detectors. It is self-evident to one skilled in the art that the avalanche photodiodes can also be replaced in the form of suitable photomultiplier tubes (PMTs), CCDs, etc. that are suitable for photon counting and have a sufficiently high quantum yield. The detectors for FCS can also be mounted directly on housing 46. The signals of APDs 57 are then conveyed into a computer 60 that is responsible for the FCS analysis. A detector board 61 is provided in computer 60. Connected to computer 60 is an additional monitor 62 on which the measurement results can be displayed in a wide variety of ways. As already described in FIG. 1, scanning microscope 100 has an "independent" computer 23 that is likewise equipped with an independent peripheral device 27. The peripheral device encompasses, for example, two monitors that belong to scanning microscope 100 as standard equipment. All the control of scanning module 7 and scanning mirrors 9 provided therein, and detection using SP module 20, is executed via computer system 23.

The method proceeds, in general, in such a way that firstly a confocal overview image of specimen 15 is acquired. One or more points of interest in the image are then identified, e.g. by marking with the cursor, and the illuminating light beam or beams is/are parked there. Beam splitter slider 43 directly in front of output 45 is then set to the empty space or the single substrate. The single substrate has the advantage that one can switch over more quickly between confocal image acquisition and FCS, since no mirror sliders need to be moved between images. FCS imaging and SP module 20 can then be used more or less simultaneously. The fluorescent light is then focused onto the two detection channels 52 and 55. The APDs provide photon counting. The signal is then conveyed to detector board 61. An evaluation of the signal (including calculation of the autocorrelation and cross-correlation) is then performed using a software program, and the result is displayed on additional monitor 62. This method is typically used to determine diffusion rates, concentrations, chemical bonds, etc.

A device 65 for generating two foci 72 shifted slightly with respect to one another is arranged between scanning module 7 and deflection means 5.

FIG. 3*a* schematically depicts device 65 for bifocal illumination of a sample for FCS analysis. Illuminating light beam 3 is depicted as a solid line, illuminating light beam 3 is directed, as collimated laser light, onto a dichroic beam splitter 67. Dichroic beam splitter 67 is embodied, for example, as a beam splitter cube that splits illuminating light beam 3 into a first and a second illuminating light beam 3*a* and 3*b*. First illuminating light beam 3*a* or second illuminating light beam 3*b* is tilted relative to the respective other illuminating light beam. According to a preferred embodiment, first illuminating light beam 3*a* travels through dichroic beam splitter 67 in the propagation direction of illuminating light beam 3. Second illuminating light beam 3*b* is coupled by dichroic beam splitter 67 out of the propagation direction of illuminating light beam 3. The tilt of first illuminating light beam 3*a* relative to second illuminating light beam 3*b* can be accomplished by way of a rotatable and/or displaceable deflection mirror 68. The displacement and/or rotation of deflection mirror 68 is accomplished by means of a piezoelement or a galvanometer. It is important in this context that a rotation point 70 of the tilt of deflection mirror 68 lie in the rear focal plane of scanning optical system 12, and coincide with a rotation axis 71 of scanning mirror 9. As depicted in FIGS. 3*b* and 3*c*, first illuminating light beam 3*a* and second illuminating light beam 3*b* are imaged into two foci 72 in one plane 75 of specimen 15. Fluorescent light from the two foci 72 is conveyed in a first and second detection light beam 17*a* and 17*d* back to device 65, and there combined again. Combination is effected by way of the tilt of deflection mirror 68 and via dichroic beam splitter 67. In device 65, a beam trap 69 is associated with dichroic beam splitter 67 in such a way that is arranged opposite deflection mirror 68. Beam trap 69 serves to eliminate that detected light which is deflected by dichroic beam splitter 67 out of detected light beam 17. Behind dichroic beam splitter 67, the combined detected light beam 17 arrives at a lens 73 and is focused by the latter onto confocal detection pinhole 18. A detector 19 is provided behind detection pinhole 18. The two foci 72 are arranged in one plane 75 in specimen 15. Foci 72 themselves have a focal volume in the form of an ellipsoid. Ideally, the focal volumes are smaller in their extent along the Z axis than thickness 78 of specimen 15. The two foci 72 are arranged in specimen 15 at a spacing 74 from one another. Spacing 74 of the foci is typically greater than diameter 76 of the foci in plane 75. Modifying the tilt of deflection mirror 68 varies the spacing of foci 72. If a water-immersion objective of $N_A=1.2$ is used, the result is an extent in the axial or Z direction of approx. 3×200 nm, and a radius in plane 75 of 200 nm. Device 65 defines a rotation axis 77 that coincides with the direction defined by illuminating light beam 3 and detected light beam 17. Rotation of unit 65 causes dichroic beam splitter 67 and deflection mirror 68 to rotate correspondingly. As depicted in FIG. 3*b*, foci 72 are rotated relative to one another in plane 75 of specimen 15. The relative rotation of foci 72 with respect to the X axis is defined by angle α. Angle α lies between line 79 connecting the foci, and the direction of particle flow v.

Figure 4A:
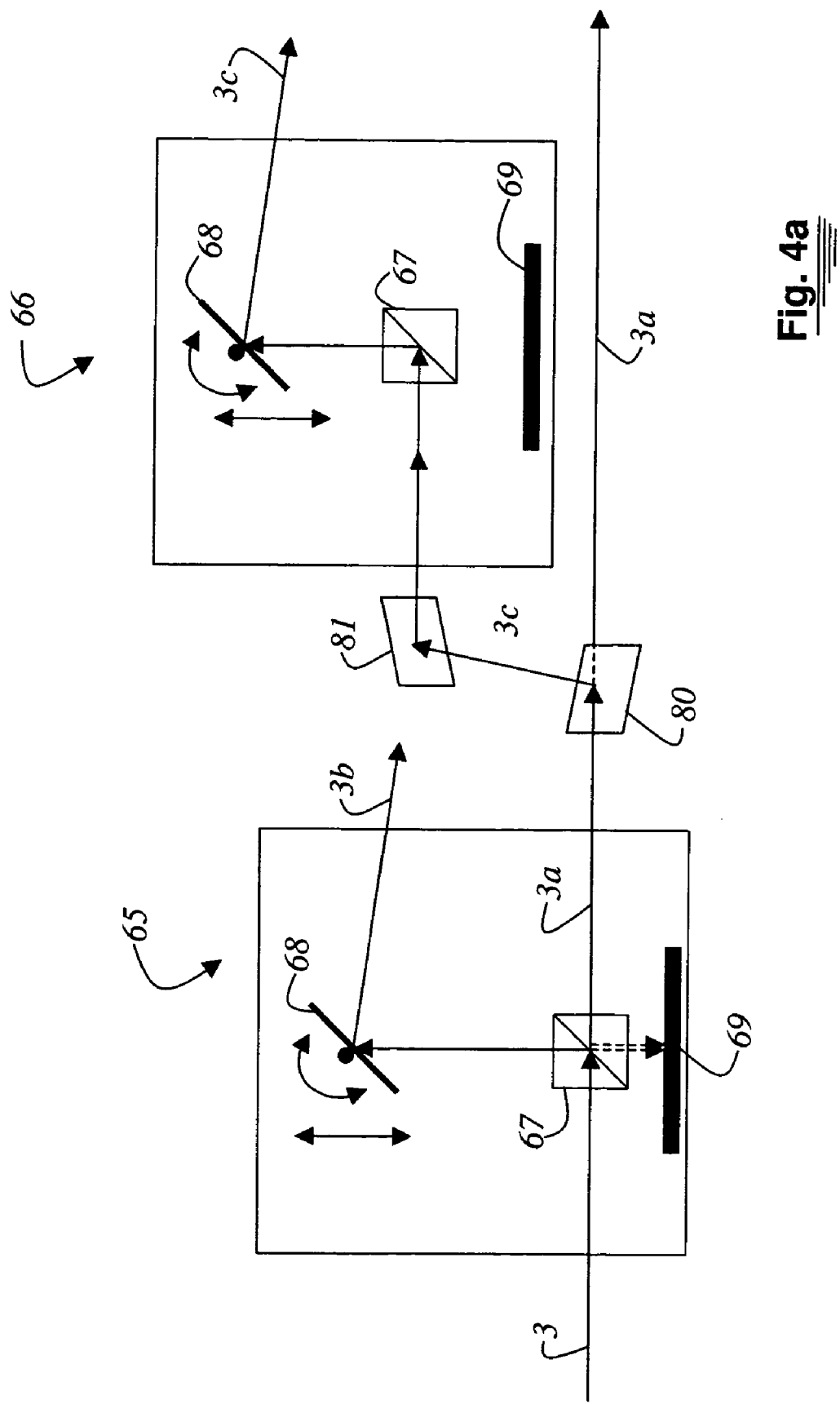
FIG. 4a schematically depicts the components for bifocal illumination of a specimen for FCS analysis with more than two foci.

FIG. 4*a* discloses an embodiment for generating more than two foci 72 in one plane 75 in the specimen. For this purpose, a second device 66 is associated with first device 65. Only the paths of illuminating light beams 3, 3*a*, 3*b*, and 3*c* are depicted here. The paths of detected light beams are analogous to the depiction in FIG. 3*a*. With the embodiment depicted here, three foci 72 (see FIGS. 4*b* and 4*c*) are generated in specimen 15, all arranged in one plane 75. Similarly to the description relating to FIG. 3*a*, a first and a second illuminating light beam 3*a* and 3*b* are generated from illuminating light beam 3 using device 65. A semitransparent beam splitter 80 is provided in first illuminating light beam 3*a*. First illuminating light beam 3*a* passes unhindered through the beam splitter. In addition, a third illuminating light beam 3*c* is generated by beam splitter 80. Third illuminating light beam 3*c* is coupled by means of a further deflection mirror 81 into second device 66. Beam splitter 80 is arranged in such a way that third illuminating light beam 3*c* is coupled out of the plane that is spanned by first and second illuminating light beams 3a and 3b. In second device 66, third illuminating light beam 3c once again strikes a dichroic beam splitter 67. If no more than three foci 72 are to be generated in specimen 15, dichroic beam splitter 67 is embodied as a deflection mirror. As with device 65 in FIG. 3a, first device 65 and second device 66 are each equipped with a rotatable and/or displaceable deflection mirror 68. In each of devices 65 and 66, a respective beam trap 69 is once again associated with dichroic beam splitter 67 in such a way that it is arranged opposite deflection mirror 68. Beam trap 69 serves to eliminate that detected light which is coupled by dichroic beam splitter 67 out of detected light beam 17.

Figure 4C:
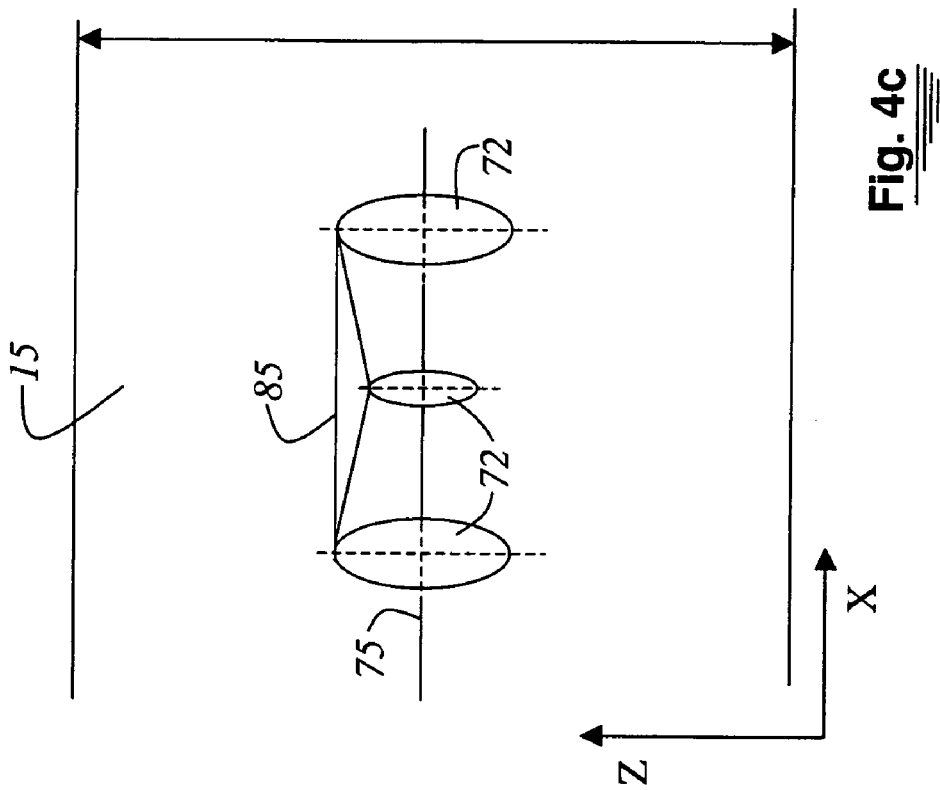
FIG. 4c shows the arrangement of the focal volumes in the specimen, depicting a cross section through the sample.
Figure 4B:
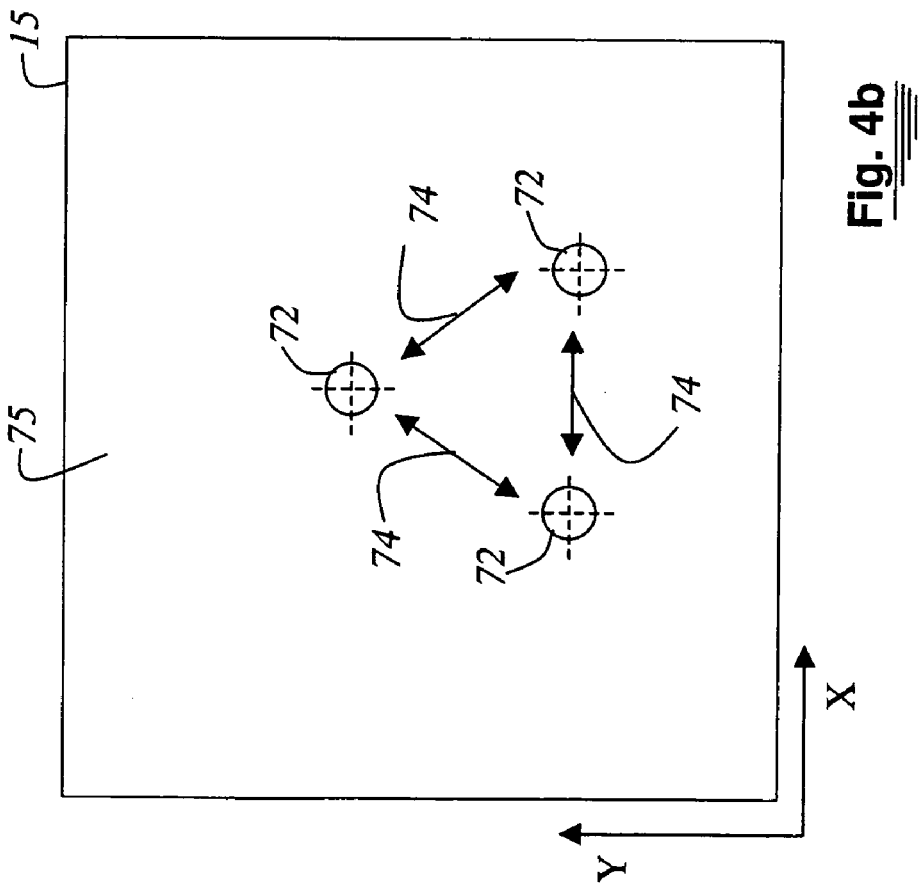
FIG. 4b shows the arrangement of the focal volumes in the specimen in a plan view.

The arrangement of focal volumes or foci 72 in specimen 15 is depicted in plan view in FIG. 4b. FIG. 4c shows the arrangement of focal volumes or foci 72 in specimen 15, a cross section through the sample or specimen 15 being depicted. Similarly to the arrangement of foci 72 in specimen 15 depicted in FIGS. 3b and 3c, foci 72 in FIGS. 4b and 4c are likewise arranged in one plane 75. Foci 72 form, in this context, the vertices of a triangle 85. Foci 72 in plane 75 of specimen 15 can be modified in terms of their spacing 74 from one another by tilting and displacing deflection mirror 68.

Figure 5:
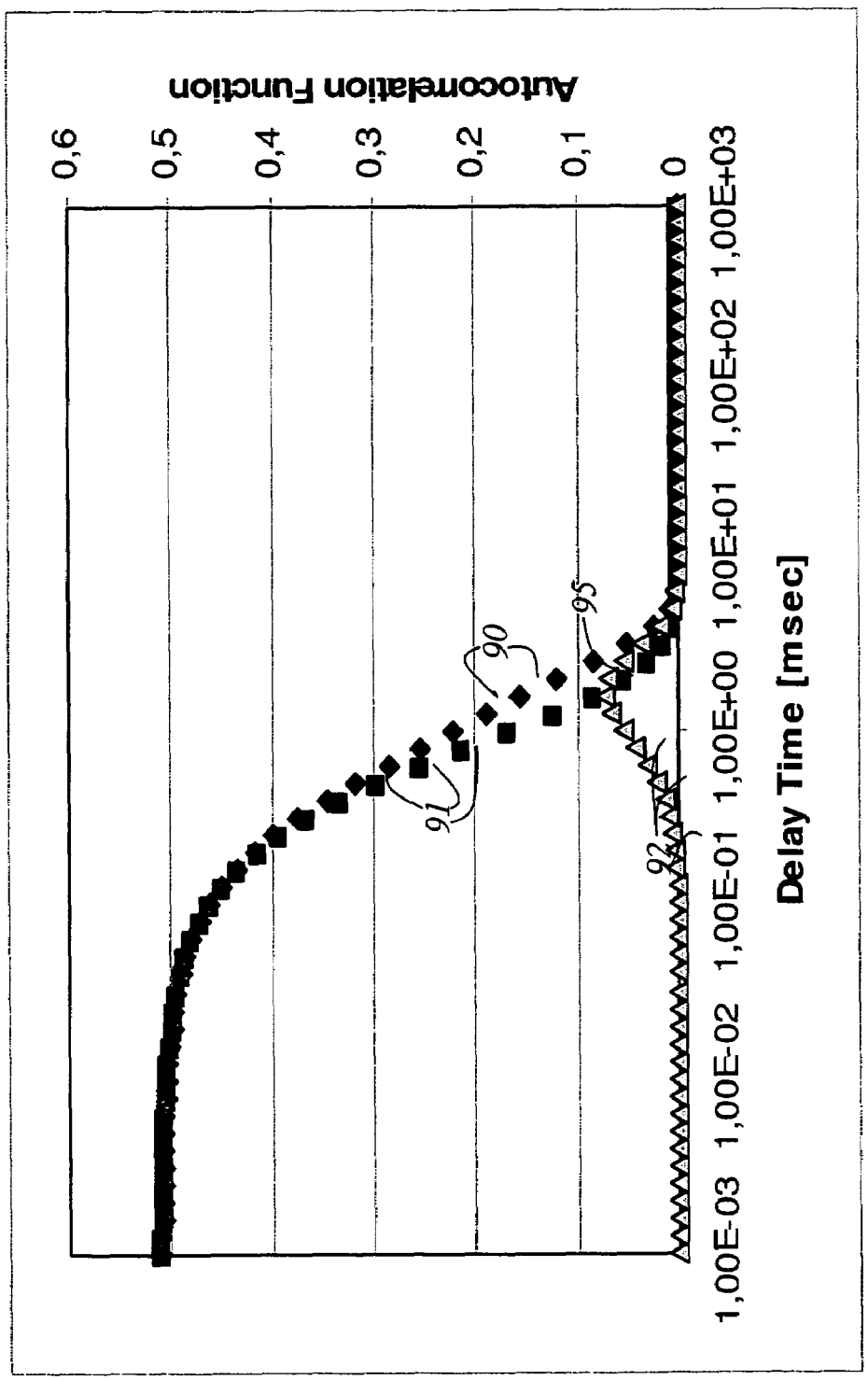
FIG. 5 shows the correlation functions for the extreme cases of 0° (diamonds) and 90° (squares) and the difference (triangles), for an autocorrelated diffusion correlation time of 1 msec.

In FIG. 5, the detected signals obtained from first detection channel 52 and second detection channel 55 are depicted in the form of correlation functions for the extreme cases of 0° (diamonds 90) and 90° (squares 91) and the difference (triangles 92), for an autocorrelated diffusion correlation time of 1 msec. The autocorrelation function of the detector signal is made up of the autocorrelation functions of the two foci 72 and the two cross-correlation functions of foci 72, and is ascertained using the following equation:

$$G(\tau) = [q^4 + (1-q)^4]G_{ac}(\tau) + [q^2(1-q)^2]G^+_{cc}(\tau) + [q^2(1-q)^2]G^-_{cc}(\tau).$$

The individual terms are described in Dittrich et al. (2002), Anal. Chem. 74:4472; $G^-_{cc}$ is $G_{cc}$ in this publication, and for $G^-_{cc}$, angle $\alpha$ is to be replaced by $\alpha + 180°$. This allows calculation of the autocorrelation functions for various orientations (angles) between the double focus and the particle flow. The example in FIG. 5 shows a case that already leads to a detectable effect in comparison with the diffusion of equal-speed, directed transport. A cross-correlated flow correlation time in of 2 msec, and a spacing of foci 72 equal to twice $1/e^2$ of the radii, were selected. The reflectivity of dichroic beam splitter 67 is 50%. The particle velocity as a result of diffusion can be approximately calculated from a maximum 95, from difference 92, or from the difference function and the spacing of foci 72.

The correlation function is identical to 0° and 180° for the case of non-symmetric branching as well, meaning that dichroic beam splitter 67 does not split illuminating light beam 3 at the 50:50 ratio. A determination of the sign of the particle flow is not possible. This can be circumvented by calculating higher-order correlation functions, in which symmetry no longer exists in the calculation and there is a difference between 0° and 180°.

The invention has been described with reference to a particular exemplary embodiment. It is self-evident, however, that changes and modifications can be made without thereby leaving the range of protection of the claims below.

What is claimed is:

1. An apparatus for determining directional transport processes with a scanning microscope comprising:
    a deflection means for coupling an illuminating light beam into a first multi-focus generating device;
    a scanning module for scanning the illuminating light beam across a specimen and for graphical display of the specimen on a peripheral device; the first multi-focus generating device for generating at least a first and a second non-parallel illuminating light beams propagating toward a rotation point in the scanning module, wherein the multi-focus generating device is disposed between the deflection means and the scanning module, and
    the rotation point defined as a point of intersection of the first and the second non-parallel illuminating light beams, the rotation point being located in a focal plane of an optical system of the scanning microscope, and the first non-parallel illuminating light beams defining a first focus in the specimen, the second non-parallel illuminating light beams defining a second focus in the specimen, the first and the second foci being disposed in a plane of the specimen; and
    wherein the multi-focus generating device comprises a dichroic beam splitter that splits the illuminating light beam into the first and the second non-parallel illuminating light beams, and a displaceable and/or pivotable deflection mirror serves to deflect the first or the second non-parallel illuminating light beam.

2. The apparatus as defined in claim 1, wherein the dichroic beam splitter is embodied as a beam splitter cube.

3. The apparatus as defined in claim 2, wherein the beam splitter cube is embodied as a 50:50 beam splitter.

4. The apparatus as defined in claim 1, wherein a beam trap associated with the dichroic beam splitter is located opposite the deflection mirror.

5. The apparatus as defined in claim 1, further comprising a second multi-focus generating device optically associated with the first multi-focus generating device in such a way that the first and the second multi-focus generating devices output the first, the second, and a third non-parallel illuminating light beams forming three foci in the plane of the specimen.

6. The apparatus as defined in claim 5, wherein the location of the foci in the plane of the specimen is modifiable by tilting of the deflection mirror in the first or the second multi-focus generating device.

7. The apparatus as defined in claim 5, wherein the first and/or the second multi-focus generating devices are disposed in a housing.

8. The apparatus as defined in claim 7, wherein at least one of the multi-focus generating devices is rotatable about a rotation axis, the rotation axis coinciding with the direction defined by the illuminating light beam and the detected light beam.

9. The apparatus as defined in claim 1, wherein the first multi-focus generating device combines a plurality of detected light beams propagating from the specimen into one detected light beam and directs the one detected light beam onto a beam splitter to form a first sub-beam and a second sub-beam and from there to direct the first and the second sub-beams into a first and a second detection channels.

10. The apparatus as defined in claim 9, further comprising a first and a second multimode fibers downstream from the first and the second detection channels to guide the first and the second sub-beams to respective avalanche photodiodes.

11. The Apparatus as defined in claim 10, wherein the avalanche photodiodes are disposed in one housing.

12. The apparatus as defined in claim 1, further comprising a water-immersion objective with a numerical aperture of 1.2, resulting in the first focus and the second focus characterized by a diameter of 200 nm in the plane of the specimen and by extending to 600 nm along a Z direction perpendicular to the plane of the specimen.

13. An apparatus for determining directional transport processes with a scanning microscope comprising:
a deflection means for coupling in an illuminating light beam;
a scanning module for scanning the illuminating light beam across a specimen, for graphically displaying of the specimen on a peripheral device and for positioning the illuminating light beam for a specific time period on a location of the specimen;
a first neutral beam splitter cube device for generating at least two illuminating light beams, wherein the device is disposed between the deflection means and the scanning module;
a second neutral beam splitter cube device optically associated with the first device in such a way that a first, a second, and a third illuminating light beams are generated, forming three foci in a plane of the specimen; and
a rotation point defined in the scanning module in which the illuminating light beams intersect, each of the illuminating light beams defining its respective focus, all of which foci are located in the plane of the specimen.

14. The apparatus as defined in claim 13, further comprising a water-immersion objective with a numerical aperture of 1.2, resulting in each focus being characterized by a diameter of 200 nm in the plane of the specimen and by extending to 600 nm along a Z direction perpendicular to the plane of the specimen.

15. The apparatus as defined in claim 14, wherein the first and/or the second neutral beam splitter cube devices are disposed in a housing.

16. A method for determining directional transport processes using a scanning microscope comprising:
using a deflections means for coupling in an illuminating light beam into a first multi-focus generating device, obtaining a scanning module for scanning the illuminating light beam across a specimen and for graphical display of the specimen on a peripheral device, the first multi-focus generating device being located between the deflection means and the scanning module;
using the first multi-focus generating device to generate at least two non-parallel illuminating light beams from the illuminating light beam,
intersecting the at least two non-parallel illuminating light beams at a rotation point of the scanning module, the rotation point being located in a focal plane of an optical system of the scanning microscope; and
defining a respective focus for each of the at least two non-parallel illuminating light beams, all the foci being disposed in a plane of the specimen, and further comprising providing a dichroic beam splitter for splitting the illuminating light beam into a first and a second non-parallel illuminating light beams.

17. The method as defined in claim 16, further comprising adjusting a spacing between the foci by tilting a displaceable and/or pivotable deflection mirror optically associated with the first or the second non-parallel illuminating light beam.

18. The method as defined in claim 16, further comprising providing a beam trap optically associated with the dichroic beam splitter and located opposite the deflection mirror.

19. The method as defined in claim 16, further comprising combining light beams propagating away from the specimen by the first multi-focus generating device into one detected light beam.

20. The method as defined in claim 19, further comprising directing the light beams onto a beam splitter, forming a first sub-beam and a second sub-beam and directing the respective sub-beams into a first and a second detection channels.

21. The method as defined in claim 20, further comprising guiding the first and the second sub-beams via a first and a second multimode fibers to at least one avalanche photodiode.

22. The method as defined in claim 21, further comprising calculating an autocorrelation function from detected signals detected by the at least one photodiode.

23. The method as defined in claim 22, further comprising performing fluorescence correlation spectroscopy using the detected signals processed by a computer.

* * * * *